United States Patent
Griencewic (10) Patent No.: US 6,320,591 B1
(45) Date of Patent: Nov. 20, 2001

(54) SYSTEM AND METHOD FOR THE UTILIZATION OF AN ELECTRONIC BOOK

(75) Inventor: Richard W. Griencewic, McCook Lake, SD (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/393,249

(22) Filed: Sep. 10, 1999

(51) Int. Cl.⁷ .................................................. G06T 11/40
(52) U.S. Cl. ............................................. 345/582; 345/901
(58) Field of Search .................................. 345/173, 326, 345/348, 349, 350, 357, 430, 901, 582, 589, 930

(56) References Cited

U.S. PATENT DOCUMENTS

| | | | |
|---|---|---|---|
| 5,500,929 | 3/1996 | Dickinson | 395/160 |
| 5,555,354 | 9/1996 | Strasnick et al. | 395/127 |
| 5,596,700 | 1/1997 | Darnell et al. | 395/340 |
| 5,813,007 | 9/1998 | Nielsen | 707/10 |
| 5,821,931 * | 10/1998 | Berquist et al. | 345/346 |
| 5,835,089 | 11/1998 | Skarbo et al. | 345/335 |
| 5,842,018 | 11/1998 | Atkinson et al. | 395/700 |
| 6,091,930 * | 7/2000 | Mortimer et al. | 434/362 |

* cited by examiner

*Primary Examiner*—Almis R. Jankus
*Assistant Examiner*—G. F. Cunningham
(74) *Attorney, Agent, or Firm*—Kenneth J. Cool; William J. Breen, III; Suiter & Associates PC (57) ABSTRACT

A system and method for utilizing an electronic book is disclosed, comprising generating a first label capable of being utilized to indicate a relationship with a first element of an electronic book and generating a second label capable of being utilized to indicate a relationship with at least one of the first element and a second element of an electronic book. The first label and second label are capable of being utilized to access at least one of the first element from the first label and at least one of the first element and the second element from the second label. In an exemplary embodiment, a user may specify a label to correspond with an element of an electronic book. Additionally, labels may be utilized to access the element of the electronic book by the user. Labels may also be modified by size, shape, text, color, apparent texture, and the like. Furthermore, labels may be utilized to indicate a relationship with an element.

32 Claims, 6 Drawing Sheets

SYSTEM AND METHOD FOR THE UTILIZATION OF AN ELECTRONIC BOOK

FIELD OF THE INVENTION

The present invention generally relates to the field of electronic books, and particularly to a system and method for the utilization of an electronic book.

BACKGROUND OF THE INVENTION

The popularity of electronic books has steadily increased. Electronic books are digital information appliances designed for viewing electronic titles. Examples of electronic books include Everybook®, Rocket eBook®, and Softbook®. Titles include traditional books, magazines, articles, newspapers, texts, pictures, and the like that are stored in an electronic format that may be accessed by an electronic book. In some instances, titles may be downloaded to the electronic book over the Internet either directly or through the use of an information handling system. Generally, electronic books are designed to allow the viewing of the text, but not the alteration, copying or printing of the text so as to protect the provider from unauthorized distribution. Electronic books are available in a wide range of styles. Some are single screened devices that allow a user to turn a page to read the text. Dual screened and large screened devices are also available to view multiple pages at the same time.

To increase the popularity of electronic books, manufacturers of these devices aspire to make the reading of an electronic book as close as possible to the experience of reading an actual paper book. Shape and size are two factors that have been addressed in the manufacturing of an electronic book. Smaller devices that are ergonomically designed and display pages mimicking a traditional book have increased the popularity of the device. Furthermore, increases in the design of these books have enabled a user to download and store multiple titles in a single electronic book. However, most books are designed with a singular bookmark that may only be utilized in one location of the electronic book at a time. Multiple users and/or a user desiring to label more than one item in an electronic book do not have the ability to do so utilizing current electronic books.

There are some systems and methods of attaching markers to textual data. However, in some instances these markers are only rectangular in shape, and may only be attached to text. Additionally, these markers apply only to editable text, and not to the type of elements generally encountered in an electronic book, namely heavily encrypted read only text and graphics. Furthermore, these markers do not provide for the ability to differentiate properties and indicate relationships between the label and the desired element. Neither do these markers allow a user to access the desired element from the marker, rather they merely serve as a form of notation. Therefore, it may be advantageous to utilize a system and method for the utilization of an electronic book with multiple labels that may be attached to both textual and graphical data.

SUMMARY OF THE INVENTION

The present invention is directed to a system and method for utilizing an electronic book, comprising generating a first label capable of being utilized to indicate a relationship with a first element of an electronic book and generating a second label capable of being utilized to indicate a relationship with at least one of the first element and a second element of an electronic book. The first label and second label are capable of being utilized to access at least one of the first element from the first label and at least one of the first element and the second element from the second label.

In an exemplary embodiment of the present invention, a user may specify a label to correspond with an element of an electronic book. Labels may be utilized to indicate relationships of the label with the element. For example, labels may be utilized to indicate a topic of interest, type of element, a user-defined relationship, and a particular user utilizing the label. Therefore, a user may view the relationship of the label with the element without the need of manually accessing the element. Additionally, the user may utilize labels to access the element of the electronic book. Furthermore, labels may include a user-defined property. For example, labels may be modified by size, shape, text, color, and the like. In addition, labels may be utilized to indicate a relationship with an element.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
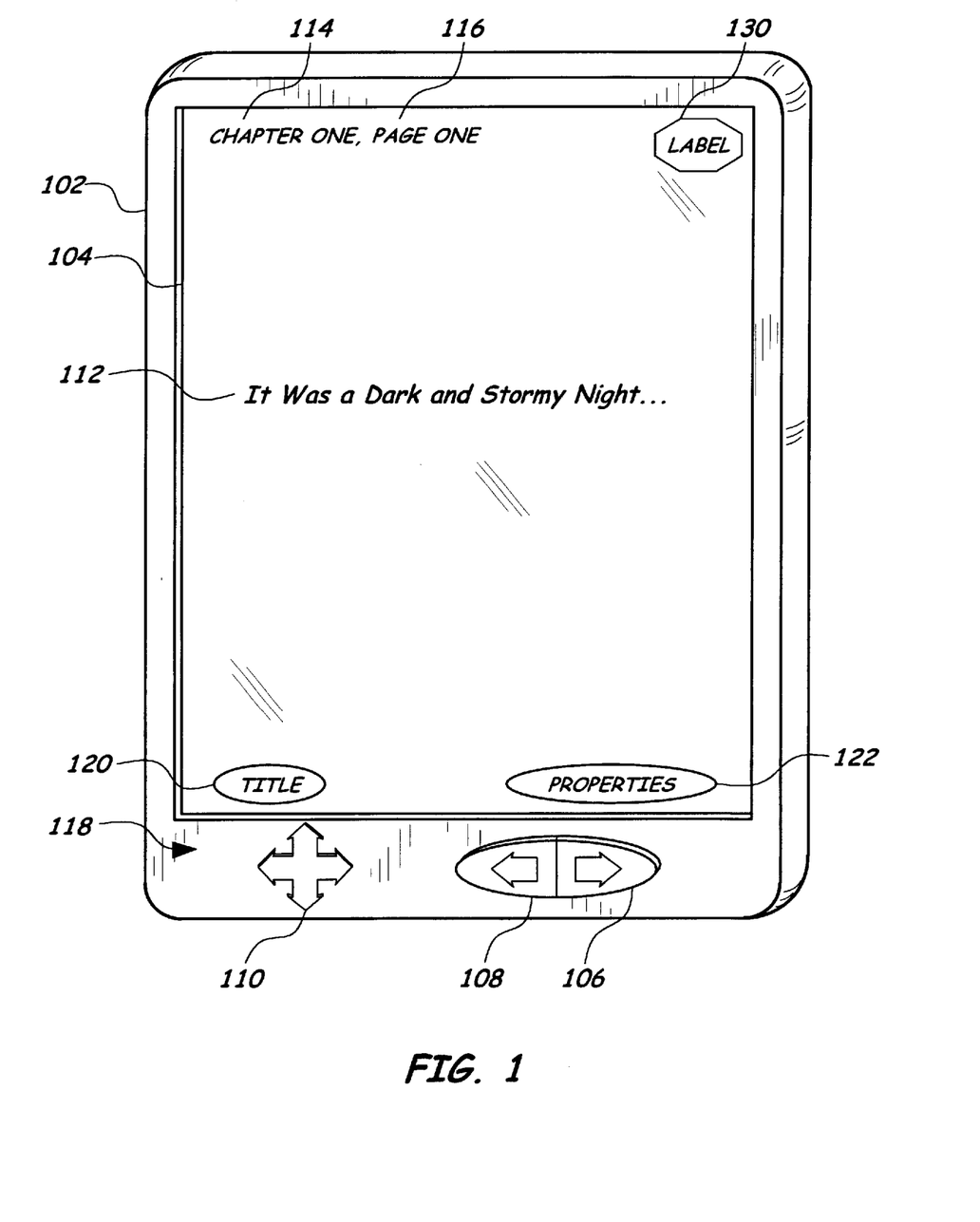
FIG. 1 is an isometric drawing depicting an exemplary embodiment of the present invention wherein an electronic book with navigation controls and a label is shown.

Referring now to FIG. 1, an exemplary embodiment of the present invention is shown. An electronic book 102 includes a display 104 to communicate information contained in an accessed title, in this instance a mystery novel with the text, "it was a dark and stormy night" 112. Controls may be utilized to access pages contained in a title. For example, forward 106 and backward 108 buttons may be utilized to navigate through the title or plurality of titles stored in the electronic book. Information related to the displayed material 112, such as the relevant chapter 114 and page number 116 may also be communicated. Additionally, a cursor control device 110 may be employed to access information and features contained in the book 102, such as a menu bar 118 listing functions such as accessing a title 120 and a properties 122 function to control operations of the electronic book, such as contrast, backlighting, and the like. Furthermore, a label 130, in this instance shown as a bookmark in the corner of the display 104 may be utilized to indicate a relevant page. A label 130 may be accessed in a variety of different ways, including accessing the label from the properties 122 function. For example, a menu bar or pop-up menu may be utilized to access the properties function and thereby the label function.

Figure 2:
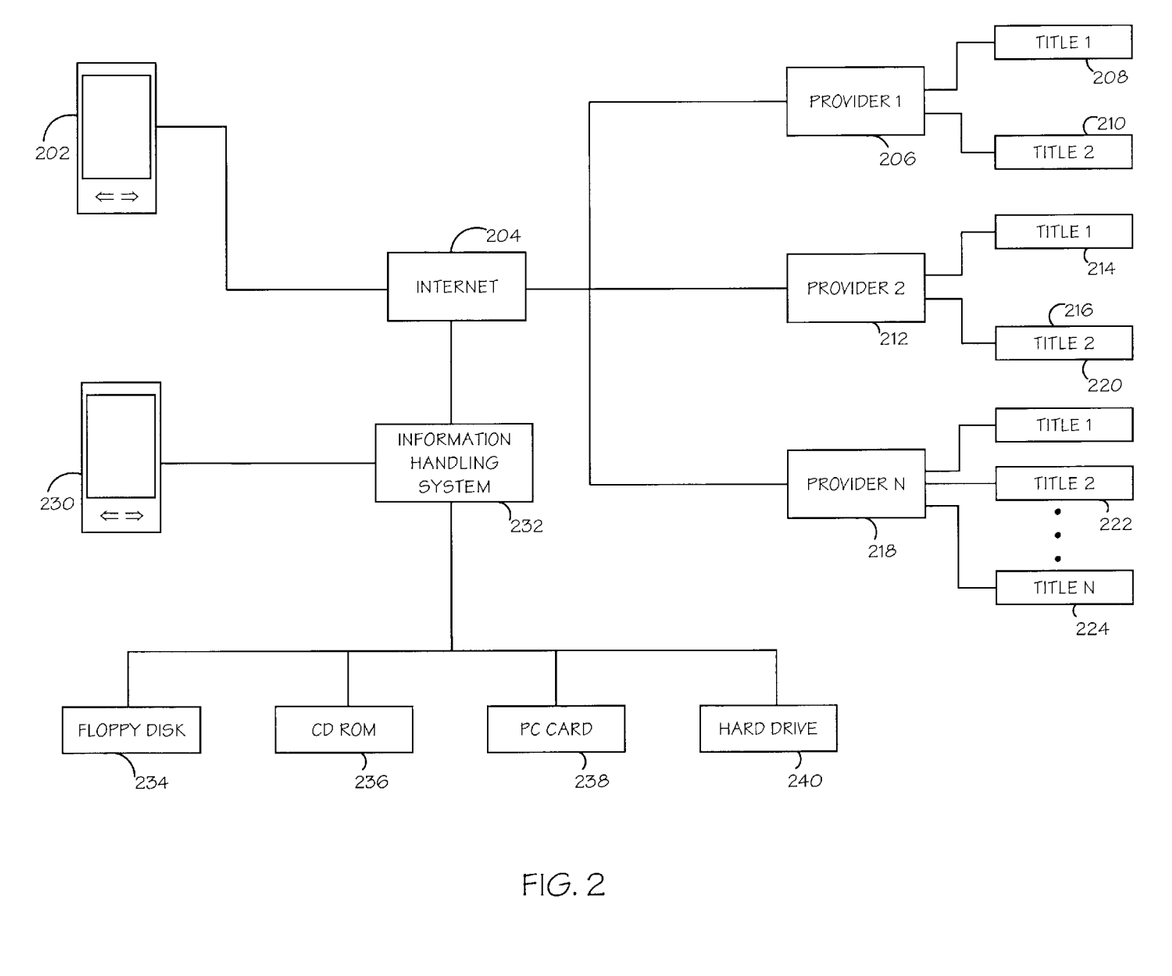
FIG. 2 is a diagram depicting an exemplary embodiment of the present invention wherein a network that may be utilized for providing titles is shown.

Titles may be provided in a wide variety of ways, an example of which is shown in FIG. 2. An electronic book 202 may directly access the Internet 204 to obtain titles from providers. For example, a first provider 206 may provide titles traditionally thought of as newspaper articles. Therefore a user may access a first title 208 such as a sport story and a second title 210 that may include a comic strip. A second provider 212 may supply novels, so a user may access a first title 214 that may include a best seller and a second title 216 that may include a child's picture book. A nearly endless variety of providers 218 of titles 220, 222, and 224 may be available to a user.

In some instances, an electronic book 230 must utilize an information handling system 232 to access the Internet 204 to retrieve titles. It may be preferable to receive titles from devices connected to an information handling system 232. For example, a floppy disk 234, compact disk read only memory 236 (CD ROM), PC card 238, and information contained on a hard drive 240 may be utilized to transfer titles to an electronic book 230. By utilizing this method, a provider may ship a medium containing a title to a user for use with an electronic book without the necessity of connecting the electronic book to a network.

Figure 3:
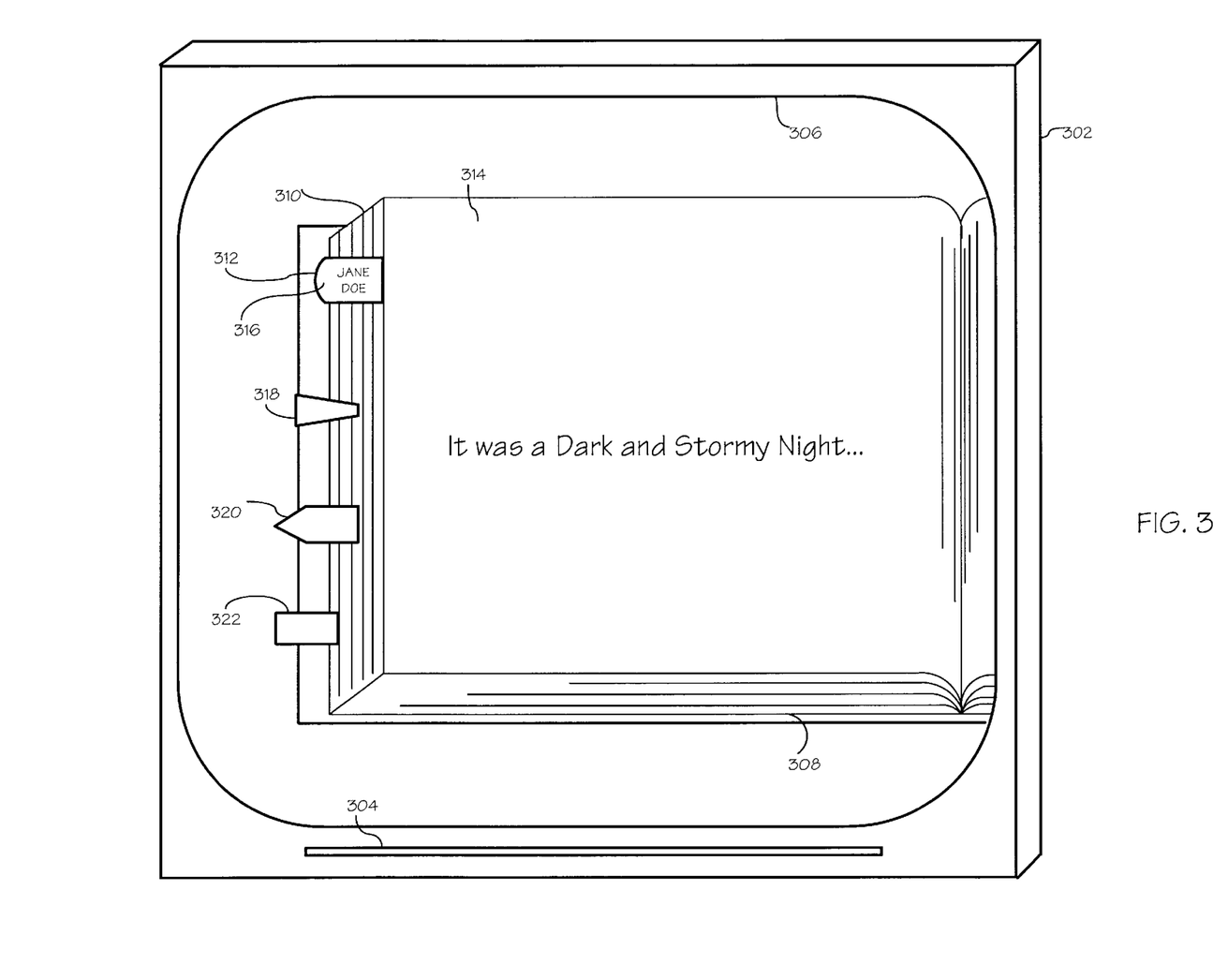
FIG. 3 is an isometric drawing depicting an exemplary embodiment of the present invention wherein a plurality of labels is utilized to indicate a relationship with an element of an electronic book.

Referring now to FIG. 3, an exemplary embodiment of the present invention is shown. An electronic book 302 with a sensor strip 304 is shown. The strip 304 may be utilized to turn pages is a natural fashion similar to turning pages in a paper-based book. A screen 306 may be utilized to display a title 308 shown as a paper-based book. In this instance, the title 308 includes a display of the edge 310 of the book to encourage more realistic and user friendly interaction. A label 312 may be utilized to access an element in the electronic book, in this instance a page 314. Elements may include pages, text, graphics, sentences, paragraphs, symbols, or any other element that may be apparent to a person of ordinary skill in the art. One advantage of the present invention over previous systems is the ability to utilize nontextual elements such as graphics and symbols. For instance, a user may choose to indicate a graphic, such as an illustration, picture, and the like with the use of a label. For example, a label may correspond to an element contained in the graphic or language utilized to indicate the presence of the graphic. It may be preferable to utilize a touch screen as a display 306 so a user may touch a label to access the relevant element. In this way, natural usage of an electronic book 302 may be achieved. Additionally, labels may be utilized to indicate a relationship with the item of usage. In one example, the relationship may include indicating the placement of the item of usage in the electronic book, such as location within a title or plurality of titles.

In another embodiment the relationship, such as relevant topic of the element, type of element, the user that is utilizing the element, a user defined relationship such as point of interest or any other relationship that may be apparent to a person of ordinary skill in the art may be indicated utilizing a wide variety of methods. The size, apparent texture such as mottling to indicate roughness or highlights to indicate glossy sheen, shape, color, text entry on the label, placement of a plurality of labels with respect to each other, or any other property may be utilized to indicate the relationship. For instance, a label may indicate the particular user of a label, such as a label 312 with textual information written on it 316, in this case that Jane Doe placed this label 312. Furthermore, labels may be utilized in different shapes such as rounded 312, tabular 318, pointed 320, displayed as a traditional bookmark 322, and the like, so as to indicate various relationships. For example, users may utilize different label properties to indicate different relationships between the label and the element, such as color for topics of interest, shape for a user utilizing the mark, size for degree of interest, and the like.

Additionally, labels may be displayed to indicate the relationship of the elements in the title. For example, labels may be shown at different "depths" in the edge 310 of an electronic book so a user may determine that a certain label and its corresponding element are contained in a earlier portion of the book 318 wherein a label 314 corresponding with a currently displayed element 314 may be shown to correspond with that displayed element. As stated earlier, if combined with a touch screen, a user could access a label and the related item of usage simply by touching the label.

Figure 4:
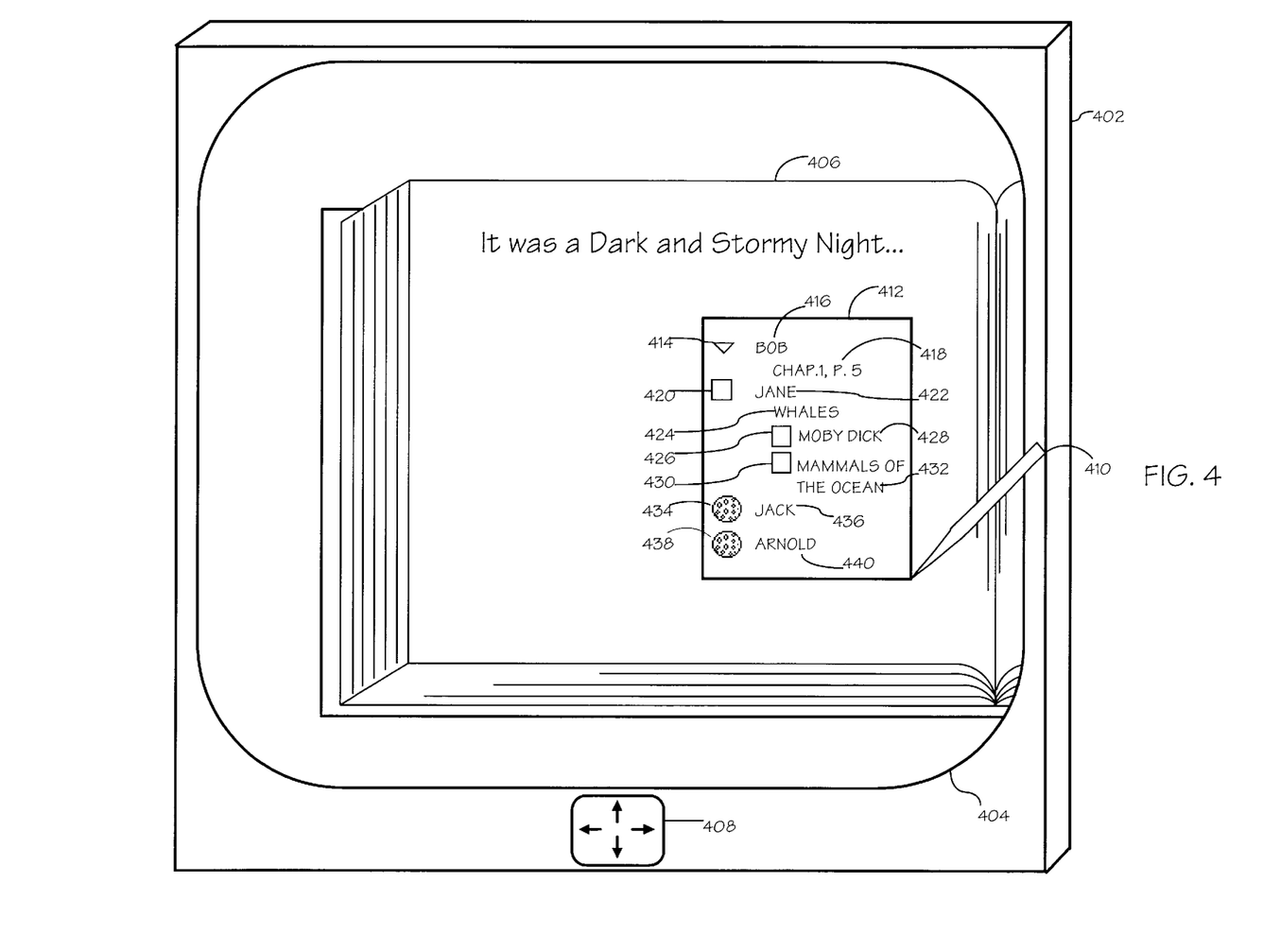
FIG. 4 is an isometric drawing of an exemplary embodiment of the present invention wherein a pop-up menu of labels is displayed.

Referring now to FIG. 4, an additional exemplary embodiment is shown wherein labels may be accessed from a separate screen. An electronic book 402 may include a screen 404 to display a title 406. Additionally, input controls, such as a cursor navigation control 408 or stylus 410 may be utilized to interact with images on the screen 404. In this embodiment, a separate screen 412 is utilized to display a plurality of labels used to indicate a relationship with an element and that may be accessed under the present invention. Various relationships may be indicated using a variety of properties of exemplary labels under the present invention. For example, an angular label 414 may be used to indicate that a user 416 had placed this label, and furthermore may indicate where the label is placed 418. In this example, the relationship of the label to the element is that of a user. A label may also be utilized to indicate relationship, which includes a topic of an element. For example, a user 422 to indicate a certain user-defined relationship, such as a point of interest, which includes whales 424, may utilize a label 420. In this example, the user may utilize this particular label with particular points of interest, such as utilizing a label 426 to correspond to an element in a title like Moby Dick 428 and another label 430 to indicate the relationship of that point of interest to a mammals of the ocean title 432. In another example, a label may be utilized with a particular topic, such as golf topics contained in various titles. For example, a label 434, in this instance shown as a golf ball, may be used to indicate a relationship of a golf topic with a particular element 436. A plurality of labels may be used so that a listing of relevant topics may be utilized, for example, a label 438 showing a golf ball similar to another label 434 to indicate an additional relationship of a golf topic with an element 440. Therefore, a user utilizing the present invention may search for relevant elements by viewing the labels relating to those elements. By allowing a user to choose different labels to correspond with elements, a user may more easily utilize an electronic book of the present invention.

Figure 5:
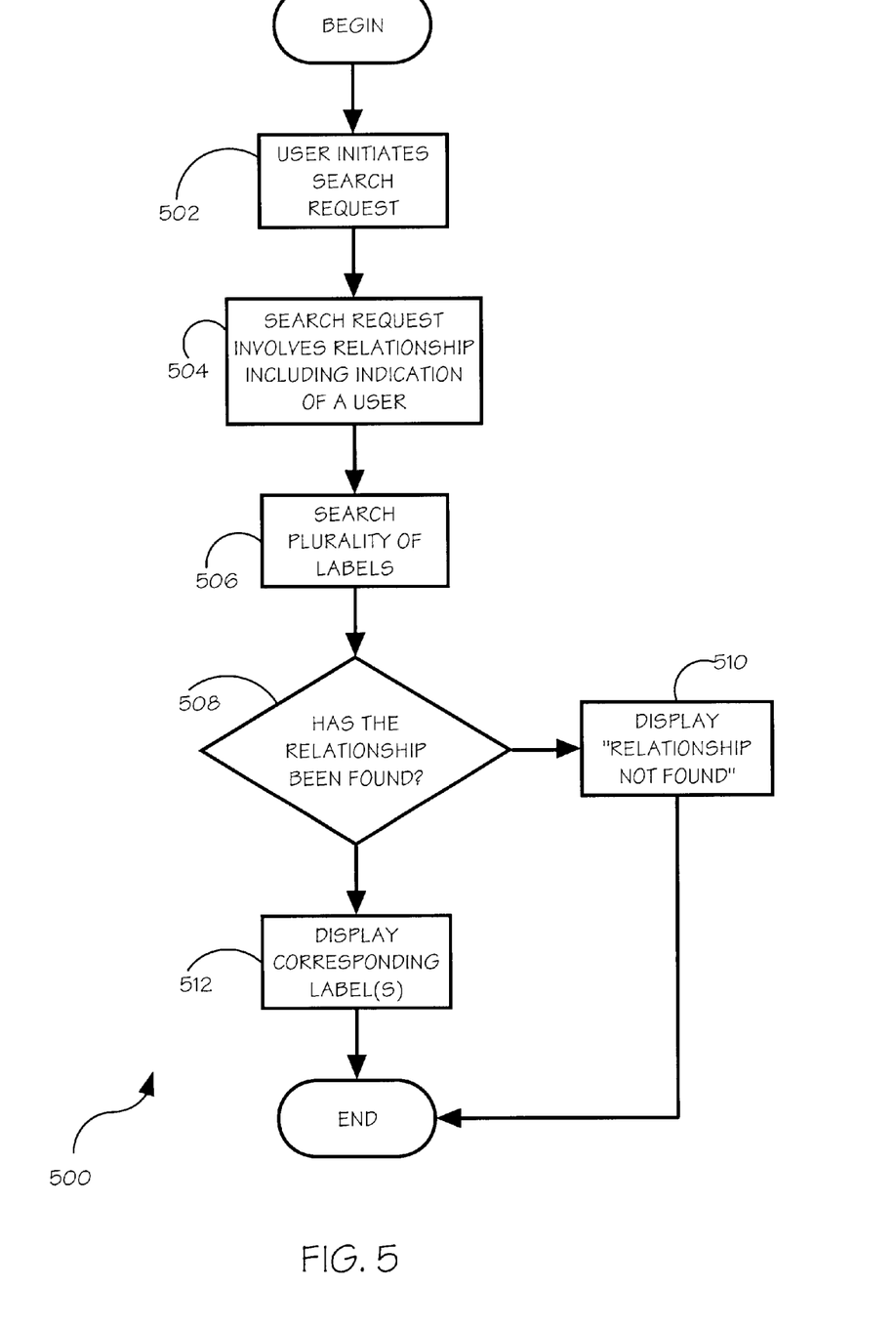
FIG. 5 is a flow chart depicting an exemplary method for searching labels pertaining to relationships and properties.

In an additional embodiment of the present invention, a user may search a label or plurality of labels based on the relationship of the label with an element. For example, as shown in FIG. 5, an exemplary method 500 wherein a user initiates a search request 502 involving a relationship 504 between a label and an element is disclosed. A relationship may include a topic, type, user-defined relationship, the user that initiated the relationship between the label and the element, and the like. In this example, a user searches based on the user initiated labels. For instance, a user may mark certain elements, such as text, graphics, a particular page, and the like, so that the user may easily return to those elements. Furthermore, multiple users may utilize an electronic book wherein if each user utilized the same labels it would be difficult to determine which user initiated which label. By utilizing the present invention, a plurality of users may generate labels to specify the particular user, such as utilizing a specific property such as size, color, shape, text, and the like. Therefore, a user may search a plurality of labels 506 to determine if a particular relationship is contained in a title or plurality of titles 508. If the relationship is found, the corresponding labels 512 may be displayed enabling the user to easily determine the relevant information, in this case who generated the label and where the relevant item of usage is contained. If the relationship is not contained in the title or plurality of titles, this information may also be displayed 510. It should be apparent that properties may also be searched without departing from the spirit and scope of the present invention.

Figure 6:
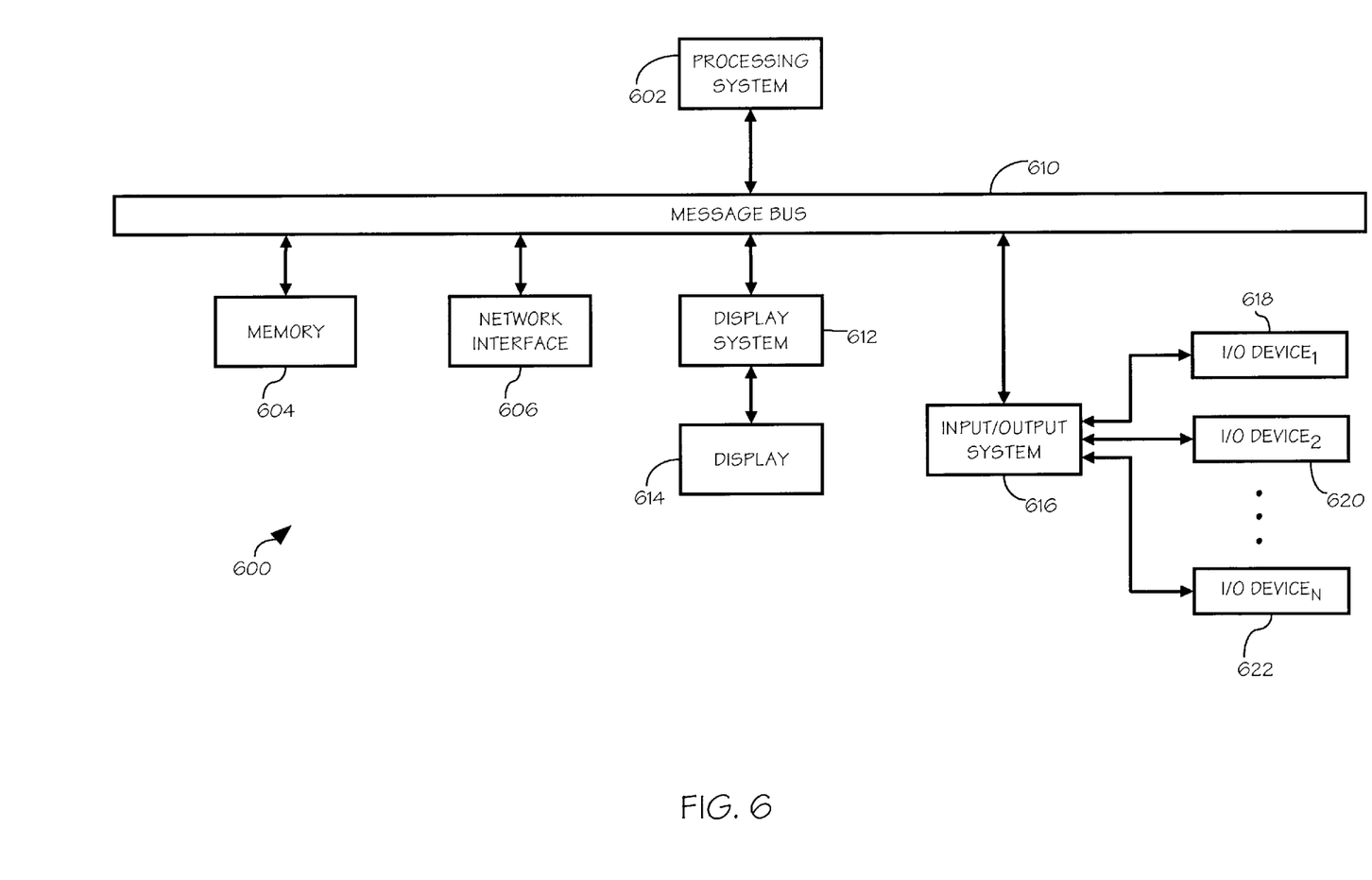
FIG. 6 is a block diagram depicting an exemplary digital information appliance capable of utilizing the present invention.

Referring now to FIG. 6, a hardware system in accordance with the present invention is shown. The hardware system shown in FIG. 6 is generally representative of the hardware architecture of a digital information appliance of the present invention. A controller, for example, a processing system 602, controls the digital information appliance 600. The processing system 602 includes a central processing unit such as a microprocessor or microcontroller for executing programs, performing data manipulations and controlling the tasks of the digital information appliance 600. Communication with the processing system 602 may be implemented through a system bus 610 for transferring information among the components of the digital information appliance 600. The system bus 610 may include a data channel for facilitating information transfer between storage and other peripheral components of the digital information appliance 600. The system bus 610 further provides the set of signals required for communication with processing system 602 including a data bus, address bus, and control bus. The system bus 610 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 610 may be compliant with any promulgated industry standard. For example, the system bus 610 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

Additionally, the digital information appliance 600 includes a memory 604. In one embodiment, memory 604 is provided on SIMMs (Single In-line Memory Modules), while in another embodiment, memory 604 is provided on DIMMs (Dual In-line Memory Modules), each of which plugs into suitable sockets provided on a motherboard holding many of the other components shown in FIG. 1. Memory 604 includes standard DRAM (Dynamic Random-Access Memory), EDO (Extended Data Out) DRAM, SDRAM (Synchronous DRAM), or other suitable memory technology. Memory 604 may also include auxiliary memory to provide storage of instructions and data that are loaded into the memory 604 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The digital information appliance 600 further includes a network interface 606. The network interface 606 communicates between the digital information appliance 600 and a remote device, such as external devices, networks, information sources, or host systems that administer a plurality of digital information appliances. For example, host systems such as a server or information handling system, may run software controlling the digital information appliance, serve as storage for a digital information appliance, or coordinate software running separately on each digital information appliance. The network interface 606 may provide or receive analog, digital, or radio frequency data. The network interface system 606 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network interface system 606 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The digital information appliance 600 further includes a display system 612 for connecting to a display device 614. The display system 612 may comprise a video display adapter having all of the components for driving the display device, including video random access memory (VRAM), buffer, and graphics engine as desired. The display device 614 may comprise a liquid-crystal display (LCD), or may comprise alternative type of display technologies, such as a light-emitting diode (LED) display, gas or plasma display, or employ flat-screen technology.

A digital information appliance 600 may further include an input/output (I/O) system 616 for connecting to one or more I/O devices 618, 620 up to N number of I/O devices 622. Input/output system 616 may comprise one or more controllers or adapters for providing interface functions between one or more of I/O devices 618–622. For example, input/output system 616 may comprise a serial port, parallel port, network adapter, printer adapter, radio-frequency (RF) communications adapter, universal asynchronous receiver-transmitter (UART) port, and the like., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the digital information appliance 600 of FIG. 6 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 604 of one or more digital information appliances configured generally as described in FIG. 6. Until required by the digital information appliance, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method for the utilization of an electronic book of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for utilizing an electronic book, comprising:
generating a first graphical non-textual label capable of being utilized to indicate a relationship with a first element of an electronic book;
generating a second graphical non-textual label capable of being utilized to indicate a relationship with at least one of the first element and a second element of an electronic book; and
displaying in a screen separate from the first element and the second element of the electronic book the first graphical non-textual label and the second graphical non-textual label, wherein the first graphical non-textual label and second graphical non-textual label are capable of being utilized to access at least one of the first element from the first graphical non-textual label and at least one of the first element and the second element from the second graphical non-textual label.

2. The method as described in claim 1, wherein at least one of the first label and the second label include a user defined property.

3. The method as described in claim 2, wherein the property includes at least one of size, shape, text, color and apparent texture.

4. The method as described in claim 2, further comprising searching at least one of the first label and the second label based on the property.

5. The method as described in claim 1, wherein the first element and the second element include at least one of text and graphics.

6. The method as described in claim 1, wherein the first element is included in a first title and the second element is included in a second title.

7. The method as described in claim 1, further comprising searching at least one of the first label and the second label based on the relationship of the first label with the first element and the relationship of the second label with at least one of the first element and the second element.

8. The method as described in claim 7, wherein the relationship includes at least one of a topic, type, origin, user defined relationship, and user.

9. A program of instructions storable on a medium readable by an electronic book for causing the electronic book to execute steps for the utilization of an electronic book, the steps comprising:
generating a first graphical non-textual label capable of being utilized to indicate a relationship with a first element of an electronic book;
generating a second graphical non-textual label capable of being utilized to indicate a relationship with at least one of the first element and a second element of an electronic book; and
displaying in a screen separate from the first element and the second element of the electronic book the first graphical non-textual label and the second graphical non-textual label, wherein the first graphical non-textual label and second graphical non-textual label are capable of being utilized to access at least one of the first element from the first graphical non-textual label and at least one of the first element and the second element from the second graphical non-textual label.

10. The program of instructions as described in claim 9, wherein at least one of the first label and the second label include a user defined property.

11. The program of instructions as described in claim 10, wherein the property includes at least one of size, shape, text, color and apparent texture.

12. The program of instructions as described in claim 10, further comprising searching at least one of the first label and the second label based on the property.

13. The program of instructions as described in claim 9, wherein the first element and the second element include at least one of text and graphics.

14. The program of instructions as described in claim 9, wherein the first element is included in a first title and the second element is included in a second title.

15. The program of instructions as described in claim 9, further comprising searching at least one of the first label and the second label based on the relationship of the first label with the first element and the relationship of the second label with at least one of the first element and the second element.

16. The program of instructions as described in claim 15, wherein the relationship includes at least one of a topic, type, origin, user defined relationship, and user.

17. An electronic book, comprising:
   a processor for executing a program of instructions on the electronic book;
   a memory coupled to the processor for storing the program of instructions executable by said processor; and
   an input and output system coupled to the processor for coupling the electronic book to a network wherein the program of instructions configures the electronic book to
   generate a first label capable of being utilized to indicate a relationship with a first element of an electronic book;
   generate a second label capable of being utilized to indicate a relationship with at least one of the first element and a second element of an electronic book; and
   display in a screen separate from the first element and the second element of the electronic book the first graphical non-textual label and the second graphical non-textual label, wherein the first label and second label are capable of being utilized to access at least one of the first element from the first label and at least one of the first element and the second element from the second label.

18. The electronic book as described in claim 17, wherein at least one of the first label and the second label include a user defined property.

19. The electronic book as described in claim 18, wherein the property includes at least one of size, shape, text, color and apparent texture.

20. The electronic book as described in claim 18, further comprising searching at least one of the first label and the second label based on the property.

21. The electronic book as described in claim 17, wherein the first element and the second element include at least one of text and graphics.

22. The electronic book as described in claim 17, wherein the first element is included in a first title and the second element is included in a second title.

23. The electronic book as described in claim 17, further comprising searching at least one of the first label and the second label based on the relationship of the first label with the first element and the relationship of the second label with at least one of the first element and the second element.

24. The electronic book as described in claim 23, wherein the relationship includes at least one of a topic, type, origin, user defined relationship, and user.

25. An electronic book, comprising:
   a processor for executing a program of instructions on the electronic book;
   a memory coupled to the processor for storing the program of instructions executable by said processor; and
   an input and output system coupled to the processor for coupling the electronic book to a network wherein the program of instructions configures the electronic book to include
      means for generating a first label capable of being utilized to indicate a relationship with a first element of an electronic book;
      means for generating a second label capable of being utilized to indicate a relationship with at least one of the first element and a second element of an electronic book; and
      means for displaying in a screen separate from the first element and the second element of the electronic book the first graphical non-textual label and the second graphical non-textual label, wherein the first label and second label are capable of being utilized to access at least one of the first element from the first label and at least one of the first element and the second element from the second label.

26. The electronic book as described in claim 25, wherein at least one of the first label and the second label include a user defined property.

27. The electronic book as described in claim 26, wherein the property includes at least one of size, shape, text, color and apparent texture.

28. The electronic book as described in claim 26, further comprising searching at least one of the first label and the second label based on the property.

29. The electronic book as described in claim 25, wherein the first element and the second clement include at least one of text and graphics.

30. The electronic book as described in claim 25, wherein the first element is included in a first title and the second element is included in a second title.

31. The electronic book as described in claim 25, further comprising searching at least one of the first label and the second label based on the relationship of the first label with the first element and the relationship of the second label with at least one of the first element and the second element.

32. The electronic book as described in claim 31, wherein the relationship includes at least one of a topic, type, origin, user defined relationship, and user.

\* \* \* \* \*